US005232325A

United States Patent [19]

Kohn et al.

[11] Patent Number: 5,232,325

[45] Date of Patent: Aug. 3, 1993

[54] APPARATUS FOR STACKING FLAT OBJECTS

[75] Inventors: Uwe Kohn; Peter Sieweke, both of Bielefeld; Andreas Schroedter, Ladbergen; Werner Ihnofeld, Oerlinghausen, all of Fed. Rep. of Germany

[73] Assignee: Windmoeller & Holscher, Lengerich, Fed. Rep. of Germany

[21] Appl. No.: 897,751

[22] Filed: Jun. 12, 1992

[30] Foreign Application Priority Data

Jun. 13, 1991 [DE] Fed. Rep. of Germany ....... 4119534

[51] Int. Cl.$^{5}$ ....... B65G 57/00

[52] U.S. Cl. ....... 414/27; 414/790.8; 414/928

[58] Field of Search ....... 414/27, 790, 790.2, 414/927, 928, 929, 790.8

[56] References Cited

U.S. PATENT DOCUMENTS 4,046,264 9/1977 Bergmann et al. ....... 414/27
4,668,147 5/1987 Sample et al. ....... 414/27
4,668,148 5/1987 Sample et al. ....... 414/790.8
4,668,158 5/1987 Sample et al. ....... 414/27 X
4,796,499 1/1989 Achelpohl ....... 414/27 X
4,850,781 7/1989 DeBin et al. ....... 414/27
5,074,735 12/1991 Stock ....... 414/27

*Primary Examiner*—D. Glenn Dayoan
*Attorney, Agent, or Firm*—Keck, Mahin & Cate

[57] ABSTRACT

An apparatus for stacking double bags, which have been severed by hot-wire welding from a tubular web of plastic and have opening-defining edges adjacent to their center line, includes a wicketer having a horizontal shaft and pairs of juxtaposed spokelike radial feeding arms which are axially spaced apart and secured to the shaft and are provided with means for retaining the double bags. Stacking pallets provided with upstanding stacking pins are slidably movable between the feeding arms, by which the double bags are deposited on the pallets, e.g., on needles provided on the pallets. To permit a trouble-free stacking of the objects without an intermediate stacking and without an interruption of the manufacturing process, a pallet-handling member for guiding and retaining stacking pallets is provided, which extends approximately radially with respect to the shaft and is pivotally movable about the shaft and in a first position delivers a stacking pallet to a pallet holder, which is movably mounted on the shaft, and in a second position removes the pallet from the pallet holder and then moves the pallet to a stack-removing device.

11 Claims, 10 Drawing Sheets

APPARATUS FOR STACKING FLAT OBJECTS

BACKGROUND OF THE INVENTION

1. Field of the Invention

This invention relates to an apparatus for stacking flat objects, preferably double bags which have been severed by hot-wire welding from a tubular web or doubled web of plastic and have opening-defining edges adjacent to the center lines of such double bags, which apparatus comprises a wicketer that comprises spoke-like radial feeding arms, which are secured to and angularly spaced around a rotatably mounted horizontal shaft and are arranged in pairs of juxtaposed arms spaced along said shaft and are provided with means, preferably suction nozzles, for retaining the objects on said arms, and which apparatus also comprises interchangeable stacking pallets, which are adapted to receive form the feeding arms the objects to be stacked on said pallet.

2. Description of the Prior Art

Wicketers of the kind described hereinbefore are usually employed to handle bags, which have been intermittently or continuously made and are intermittently or continuously delivered by a conveyor, from which said bags are removed by the wicketer, which then turns said bags through an angle of about 180° and deposits them in a stacking station, in which the bags are stacked. In order to avoid a slipping of the bags in the stack the bags are usually stacked on stacking pallets, which are provided with stacking pins, which extend through bores or holes which have previously been formed in the objects to be stacked or pierce said objects to form such holes. A special problem arises in connection with said stacking operation because the stacks must be moved out of the stacking station and a new stacking pallet for receiving the objects for forming the next stack must be fed to the stacking station and these operations must be performed without a disturbance or interruption of the operation by which the bags are made and are fed to the wicketer.

On principle, it is not possible to suddenly start the movement of a complete stack out of the stacking station because such a sudden start would result in a slipping of the objects in the stack.

From German Patent Specification 19 65 254 it is known that the process of making plastic bags which are to be stacked in a stacking station can be interrupted for some bag-making cycles, during which a stack can be moved away form a stacking deck or a stacking station. But additional control means are required for a performance of some idle cycles and this will also reduce the production rate.

Published German Patent Application 38 11 020 discloses a stacking apparatus which is of the kind described first hereinbefore and comprises a wicketer, by which the bags being delivered are deposited on prestacking support for the time in which a complete stack is carried away, and after said stack has been carried away the objects stacked on said prestacking support are deposited on the stacking support that has been fed to the stacking station in the meantime, whereafter the prestacking support is returned to a waiting position. In that apparatus the prestacking support performs a movement between end points which define a quadrangle. The prestacking on a prestacking support is relatively expensive and involves a considerable additional structural expenditure.

SUMMARY OF THE INVENTION

For this reason it is an object of the invention to provide an apparatus which is of the kind described first hereinbefore and in which the objects can be stacked without an interruption of the process of making the objects to be stacked or of the continuous feeding of the objects to be stacked and without a prestacking of said objects.

In an apparatus of the kind described first hereinbefore that object is accomplished in accordance with the invention in that a pallet-handling member provided with means for guiding and for retaining a stacking pallet extends approximately radially with respect to the shaft and is pivotally movable about the shaft and is adapted to deliver a stacking pallet to a pallet holder mounted on said shaft when said pallet-handling member is in a first position and to remove the pallet from the pallet holder when the pallet-handling is in a second position and is then operable to move the pallet to a stack-removing device.

In the apparatus in accordance with the invention a stacking pallet is inserted between adjacent wicketer arms and is retained on a pallet holder, which is rotatably mounted on the shaft, so that the stacking of a new stack on the thus inserted stacking pallet can then be initiated. The pallet-handling member is then moved to a second position and in that second position pulls the stacking pallet and the last formed stack carried thereby from the pallet holder disposed between the feeding arms and moves the pallet with the stack to a stack-removing device. As soon as the stack has subsequently been removed from the pallet, the pallet-handling member is returned to its waiting position, in which the stacking pallet is again inserted into the pallet holder between two feeding arms. In the meantime the pallet holder which is rotatably mounted on the shaft turns the previously inserted stacking pallet to its extracting position, from which the stacking pallet carrying the stack is extracted by the pallet-handling member after the latter has inserted an empty pallet into the pallet holder.

It is apparent that in the apparatus in accordance with the invention the objects delivered by the feeding arms can be stacked and each complete stack can be removed without a need for a delay or even interruption of the bag-making and bag-feeding operations.

According to a preferred feature of the invention a drum is freely rotatably mounted on the shaft and the pallet-handling member is pivoted to the shaft by a connecting arm, drive means are provided for moving the stacking pallet in tracks of the pallet-handling member between a retracted position and an extended position, in which the pallet is adapted to be locked to the drum, drive means are provided for rotating the drum, the pallet-handling member is pivotally movable to at least two positions, in one of which the pallet-handling member is adapted to move a pallet toward the drum and to cause the pallet to be locked to said drum, whereas in the second position the pallet-handling member is adapted to extract from the drum a stack-carrying pallet and to move said pallet to a stack-removing device. To pull the stacking pins or stacking needles out of the stack, which has been gripped by a gripper, the pallet-handling member is pivotally movable to a third position, in which the stacking pins or stacking needles extend outside the stack.

The drum is suitably formed with radial bores or radial openings for receiving projections or pins, which are provided at the forward end of each pallet and can be locked in the bores or openings.

Simple means for locking the pin or the projection may comprise a detent mechanism comprising a spring-biased ball or a spring-biased bolt and a mating recess formed in the pin or projection and adapted to receive and lock the ball or bolt. Such a detent mechanism can be caused to lock the pallet in a simple manner when the pallet has been moved to a certain position, and to release the pallet as it is extracted.

If the pallet is provided with a pin for retaining the pallet on the drum, the pallet will desirably be provided with a second pin, which is parallel to the first-mentioned pin and is adapted to enter a mating recess or bore in the drum to prevent a rotation of the pallet about the first-mentioned pin.

According to a further feature of the invention the connecting arm by which the pallet-handling member is pivoted to the shaft is U-shaped. The pallet-handling member is suitably located by a stop in its upper or waiting position, in which the pallet is adapted to be inserted into means for retaining the pallet on the drum.

The connecting arm by which the pallet-handling member is pivoted to the drum may be pivotally moved by means of a fluid-operable piston-cylinder unit, which is suitably operated with compressed air.

Another fluid-operable piston-cylinder unit may be provided for displacing the pallet in tracks of the pallet-handling member and is also desirably operated with compressed air.

The stack-removing device suitably comprises a gripper, which is movable in horizontal tracks. The means for moving the gripper may comprise a carriage, which is movable in tracks by an endless belt. The gripper suitably comprises gripping jaws, which are movable toward and away from each other by a fluid-operable piston-cylinder unit.

By means of the apparatus in accordance with the invention, objects such as bags or the like can be collected on displaceable pallets, which during the stacking operation are held on a drum, which constitutes a pallet holder and that collection of the objects can be performed without an interruption of the operations performed to make and feed such objects. The drum is provided with a plurality of receptacles for the pallets, which are rotated in steps by the means for driving the drum. When the pallet has been retracted from the feeding arms of the wicketer, the stack is removed by a gripper, which is moved to a position in which its bottom jaw is disposed between the stack and the pallet before the top jaw of the gripper is forced down against the stack. A further pivotal movement is then imparted to the pallet to pull the stacking needles out of the stack, which can now be carried away without an obstruction.

DETAILED DESCRIPTION OF THE PREFERRED EMBODIMENT

Figure 1:
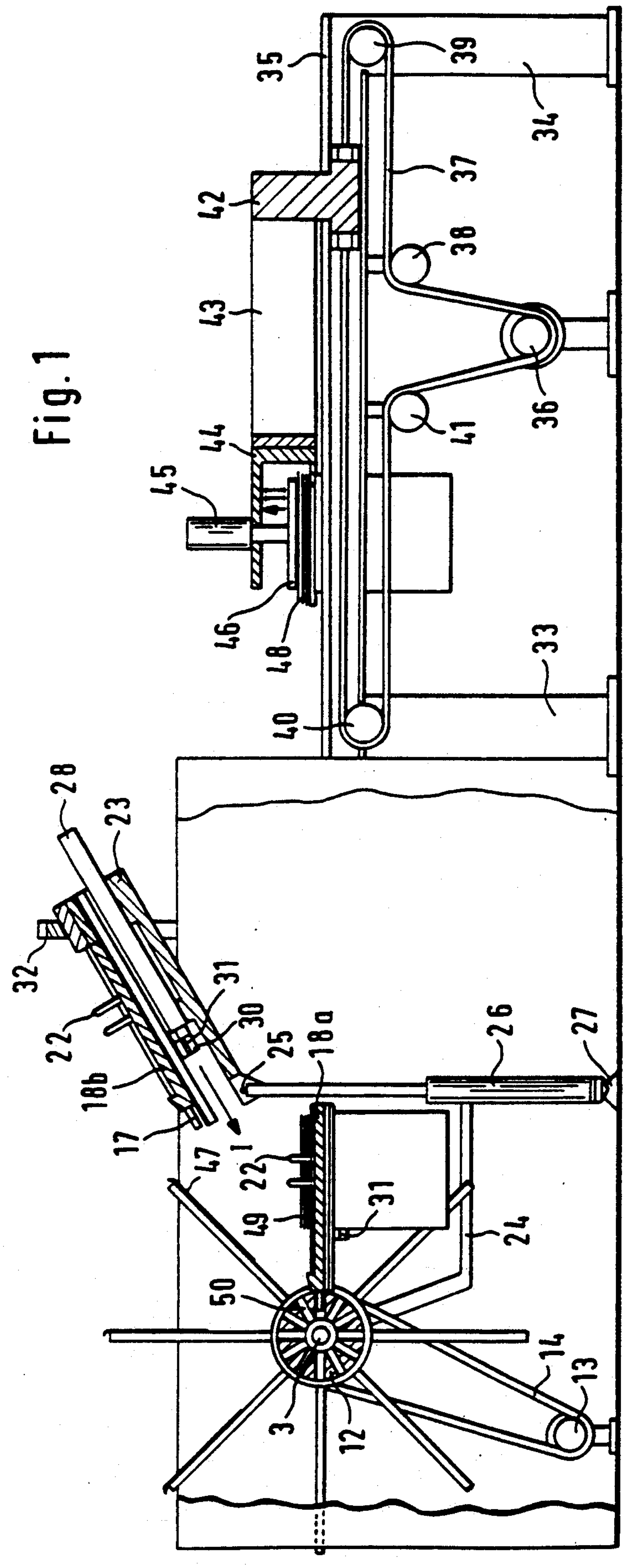
FIG. 1 is a side elevation showing a wicketer as well as means for inserting the pallets, for pivotally moving the pallets, for extracting the pallets from the feeding arms of the wicketer and for removing the stack from the pallet.
Figure 1A:
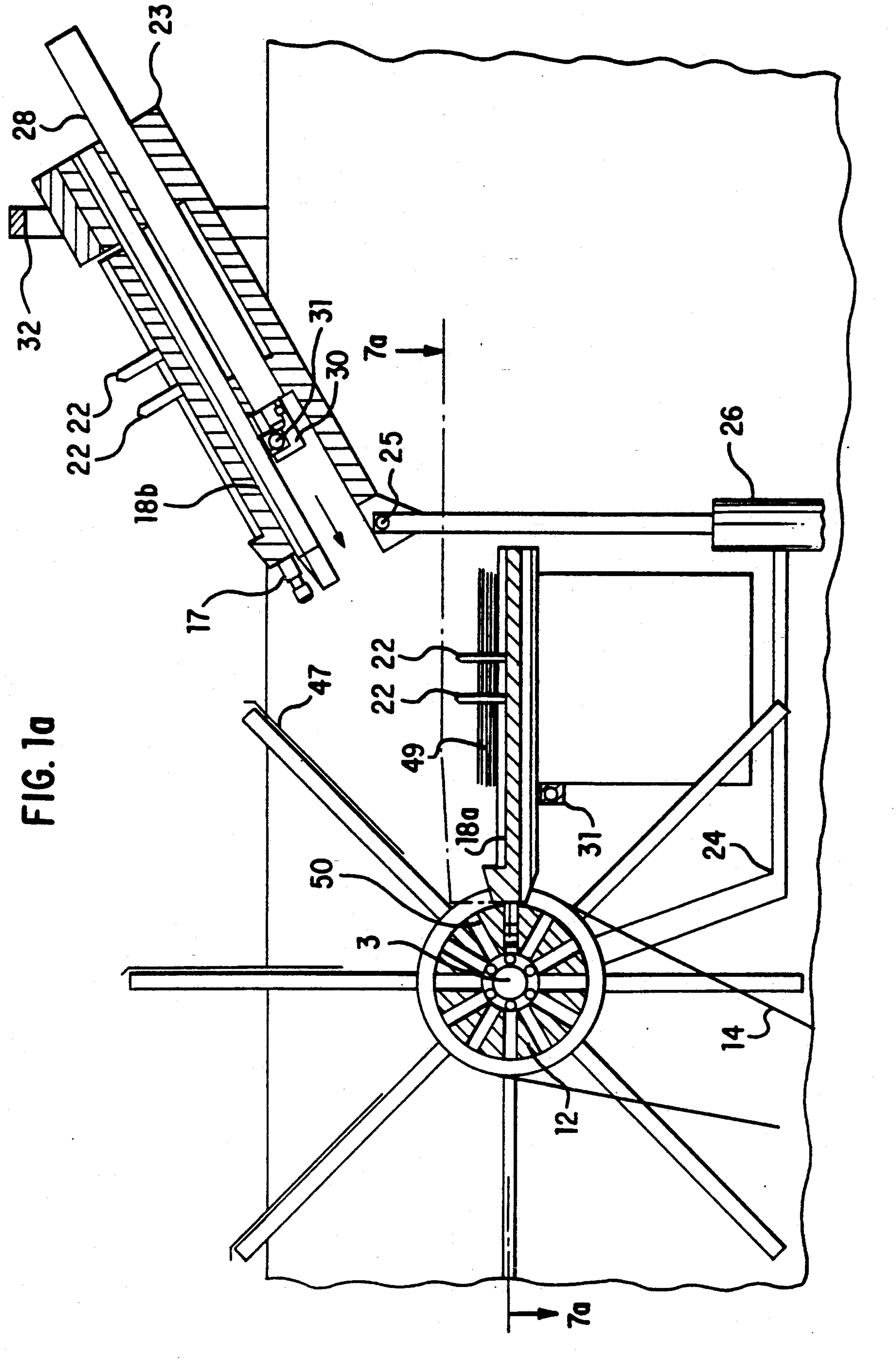
FIG. 1*a* is an enlarged view of part of the apparatus shown in FIG. 7*a*.

An illustrative embodiment of the invention will now be explained more in detail with reference to the drawing.

Figure 7:
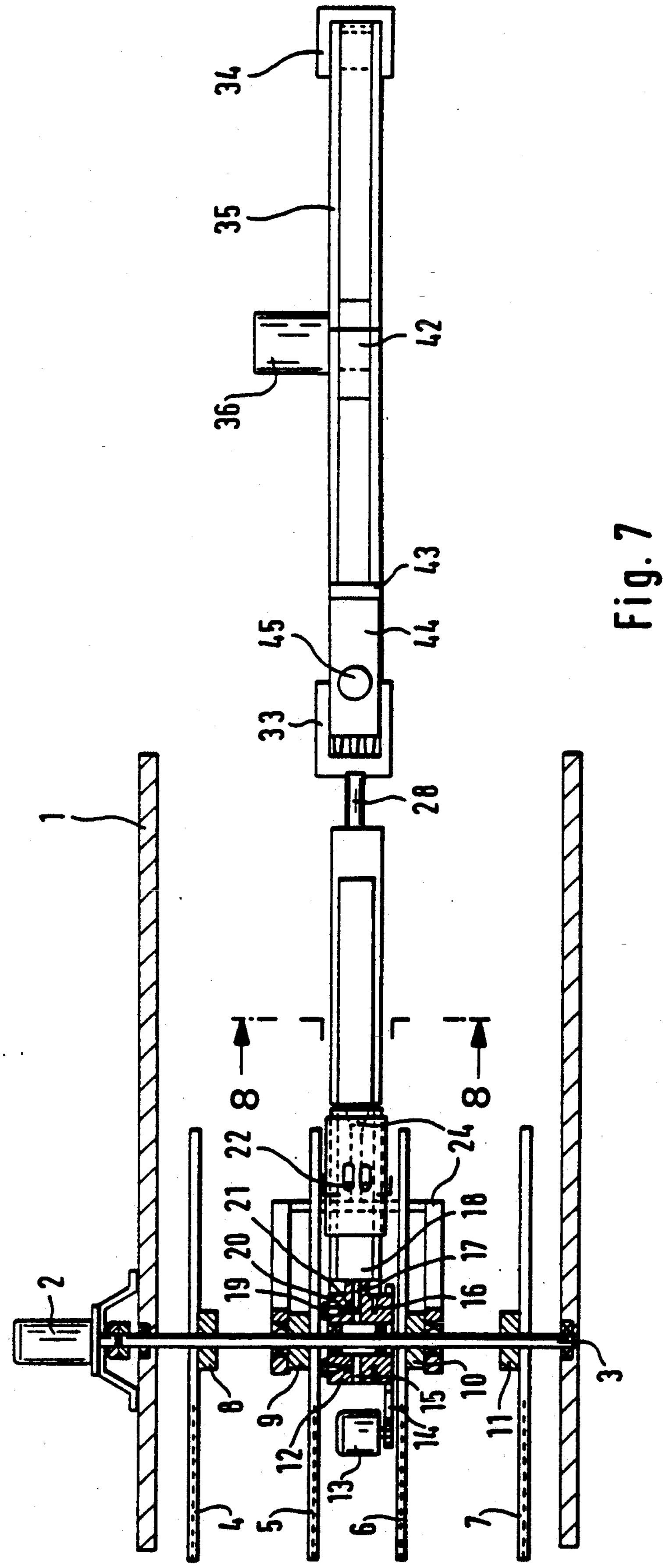
FIG. 7 is a sectional view taken on line 7—7 in FIG. 3.
Figure 7A:
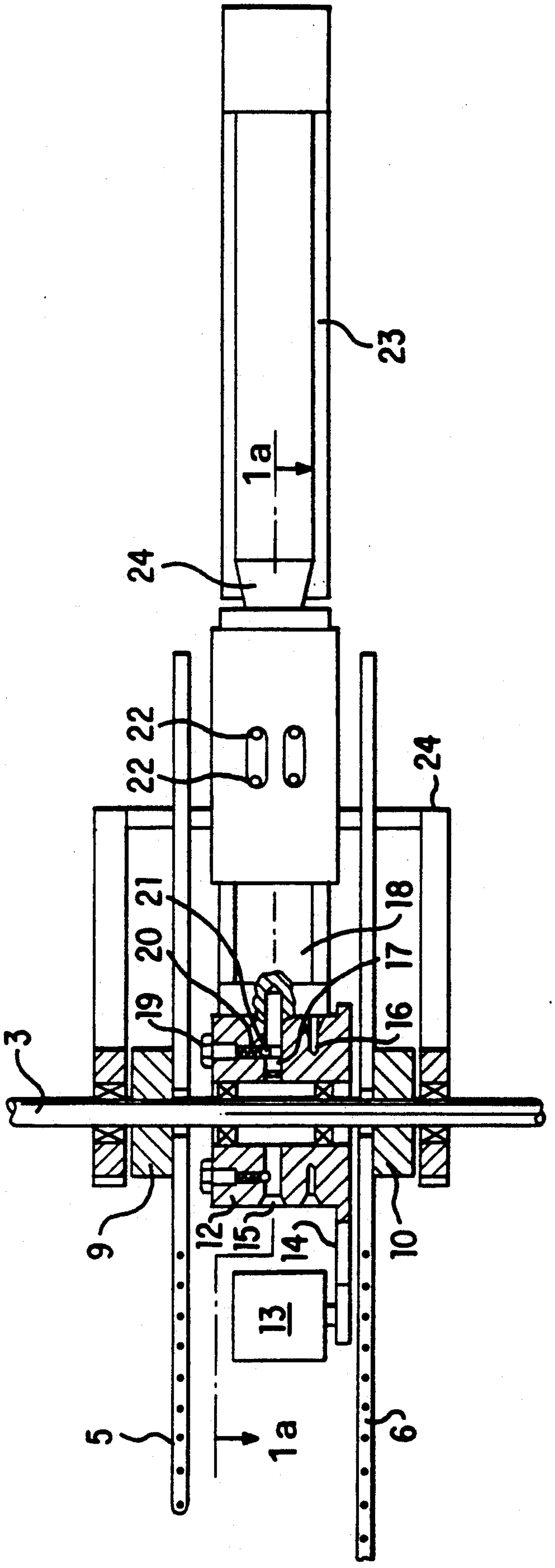
FIG. 7*a* is a sectional view on line 7*a*—7*a* of FIG. 1*a*.
Figure 8:
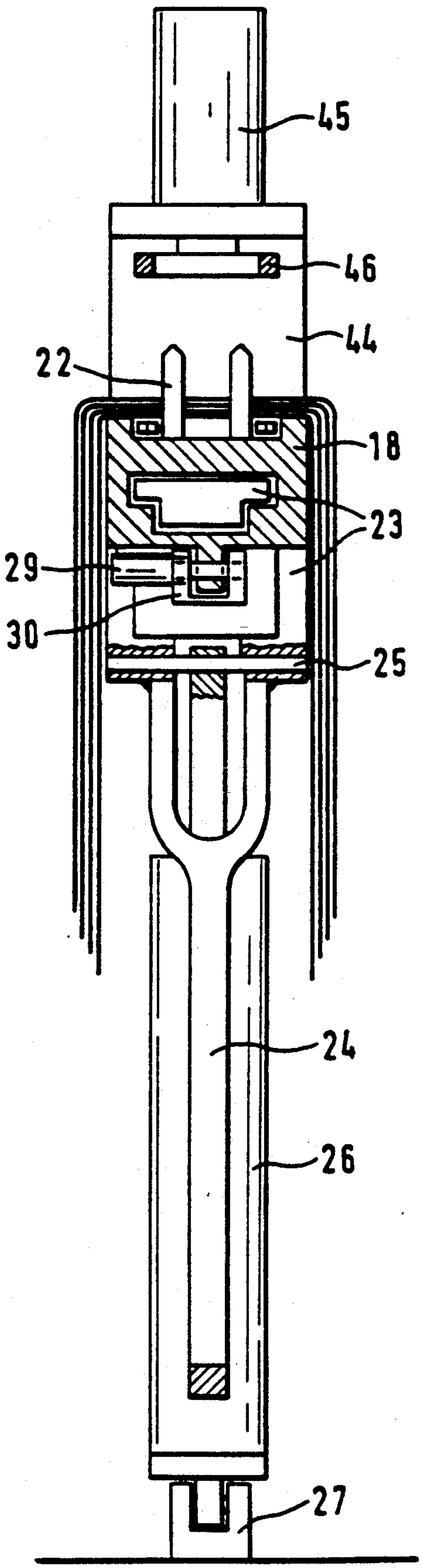
FIG. 8 is a sectional view taken on line 8—8 in FIG. 7.

As is best apparent from FIG. 7, the apparatus comprises two spaced apart side frames 1, in which a shaft 3 is rotatably mounted. The shaft 3 is adapted to be driven by a gearmotor 2 via a clutch. Four hubs 8, 9, 10 and 11 are secured to the shaft 3 and carry outwardly extending spokelike feeding arms 4, 5, 6, 7, which are tubular and formed with suction bores.

A pallet holder 12 is freely rotatably mounted on the shaft 3 at the center of its length.

The pallet holder 12 comprises at one end a gear, which permits the pallet holder 12 to be rotated by the motor 13 via the toothed belt 14. In the embodiment shown, the pallet holder 12 is formed with twelve radial bores 15, which are adapted to receive a pin 17 provided at the rear end of a pallet 18. When that pin 17 has been inserted, it is locked by the screw 19, the spring 20 and the ball 21. When the pin 17 of the pallet 18 has properly been inserted into the bore 15, the ball 21 will be urged by spring force into a groove formed in the pin 17 so that the pallet holder 12 is then non-positively connected to the pallet holder 12. To prevent a rotation of the pallet 18 about the axis of the pin 17, the pallet holder is formed with a second bore, which is parallel to the bore 15 and receives a locking pin 16, which is fixed to the pallet 18.

The pallet 18 comprises four needles 22, on which the bags are deposited.

The apparatus comprises two pallets 18, each of which is disposed either in the pallet holder 12 or in a pallet-handling member 23, which is fixed to a connecting arm 24, which is pivoted to the shaft 3 and is movable around the shaft to a position defined by a stop 32. The pallet-handling member 23 and the connecting arm 24 are rotated about the shaft 3 by a displacement of the piston rod of the cylinder 26. By a pin 25, the connecting arm 24 is pivoted to the piston rod of the cylinder 26. The cylinder 26 is pivoted to the bearing bracket 27.

In a different embodiment the pallet-handling member 23 may be turned to the required positions by the cylinder 26 and a second cylinder, which is parallel to the cylinder 26. In that case the mechanism for moving the pallet-handling member 23 has two degrees of axial translatory motion and requires three pivotal axes.

The cylinder 28 is fixed to the pallet-handling member 23 and can operate its piston to pull down one of the two pallets 18 from the pallet holder 12 onto the pallet-handling member 23 or to push a pallet 18 from the pallet-handling member 23 onto the pallet holder 12. A pallet can be positively locked to the cylinder 28 in case of need in that the piston of the cylinder 29 is pushed through a bore 31 of the pallet. The cylinder 29 is fixed by a holder 30 to the piston of the cylinder 28.

The frames 33 and 34 are fixed to a profiled track beam 35. The motor 36 drives a belt 37, which is trained around the deflecting pulleys 38, 39, 40 and 41, which are rotatably mounted in the track beam 35. The belt 37 is fixed to a carriage 42, which is mounted on rollers in the track beam 35 and can be displaced along the latter. A gripper 44 is mounted on a spacer 43, which is secured to the carriage 42. A cylinder 45 is mounted on the gripper and has a piston rod, to which a pressure-applying plate 46 is fixed, by which the stack of bags to be removed from the pallet 18 is forced against the bottom surface of the gripper. By that frictional connection the stack of bags will be held in position until the piston of the cylinder 45 is lifted to release the stack.

The mode of operation will now be explained in more detail.

In FIGS. 1 to 6 the movements performed between positions shown in consecutive figures of the drawing are performed in a sequence indicated by the Roman numerals.

During each of the phases illustrated in FIGS. 1 to 6 the shaft 3 and the suction arms 4, 5, 6 and 7 secured to the shaft are being rotated. A bag is retained by those suction arms which are disposed above the horizontal line.

The position shown in FIG. 1 will be explained first. The shaft 3 is driven by the motor 2 to rotate with the spokes 4 to 7, which are mounted on the hubs 8 to 11. At that time the pallet holder 12 is held in position relative to the frame 1. As the spokes holding a bag 47 by suction are rotated, they deposit the bag 47 on the needles 22 of the pallet 18*a*, which is non-positively connected to the pallet holder 12 by the pin 17.

At the same time the second pallet 18*b* is held on the pallet-handling member 23, which engages the stop 32, which defines a reproducible end position of the pallet-handling member 23. The piston of the cylinder 26 forces the pallet-handling member 23 against the stop 32. The piston of the cylinder 28 is in its retracted position. The piston of the cylinder 29 has been pushed through the bore 31 of the pallet 18*b* so that the pallet 18*b* is positively connected to the pallet-handling member 23 because the cylinder 29 is connected by the holder 30 to the piston of the cylinder 28. The parts are so arranged that the rotating spokes 4 to 7 and the bags 47 will not collide with the pallet 18*b*, the pallet-handling member 23 and the piston of the cylinder 26.

At that time the gripper 44 is in its retracted position and still retains the previously received stack 48 because the pressure-applying plate 46 is forced by the piston of the cylinder 45 against the bottom surface of the gripper 44.

It is assumed that the bag 47 is the last bag that is to be deposited on the stack 49. When the spokes which retain the bag 47 by suction are about to assume the position in which the bag 47 will be deposited onto the needles 22 of the pallet 18*a*, the piston of the cylinder 28 pushes the pallet 18*b* so that the pin 17 enters the bore 15 and assumes a position in which the pin 17 is locked by the ball 21. Neither the pallet holder 12 nor the pallet-handling member 23 are moved while the pin 17 is entering the bore 15 whereas the rotation of the shaft 3 is continued.

To open the gripper 44 the cylinder 45 lifts its piston, which is connected to the pressure-applying plate 46. The stack 49 of bags is then removed for being processed further. The continued processing of the stack of bags is not a subject matter of this invention.

Figure 2:
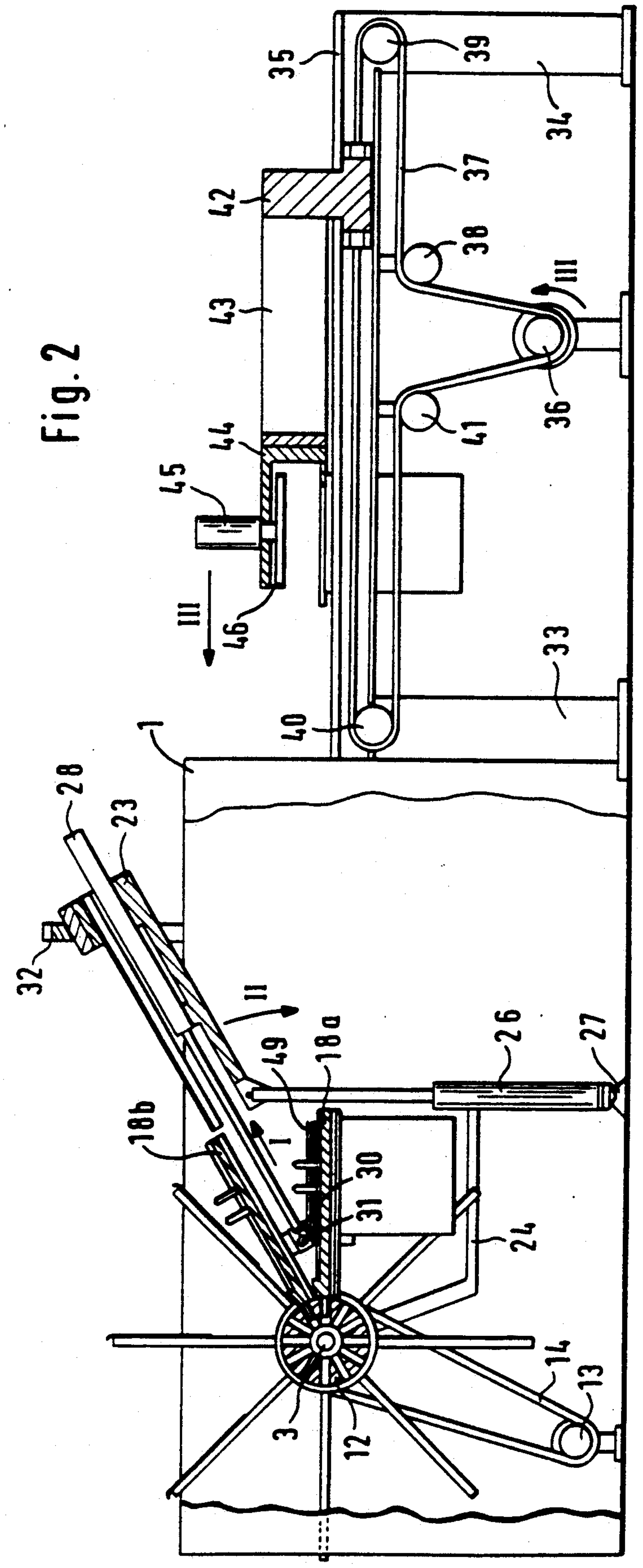
FIGS. 2 to 6 are views which are similar to FIG. 1 and show different phases of the operations performed to form and carry away the stacks.

The condition which has now been assumed is shown in FIG. 2. The bags which in that phase are carried along by the spokes are now collected on the pallet 18*b*, which has been fixed to the pallet holder 12 and the cylinder 29 then pulls its piston out of the bore 31 of the pallet 18*b* so that the holder 30 is also retracted, whereas the pallet 18*b* is not carried along. When these operations have been performed the piston of the cylinder 26 pulls down the pallet-handling member 23 and the connecting arm 24 to such an extent that the pallet 18*a* can be horizontally displaced to the right into the pallet-handling member 23. The motor 36 rotates the counterclockwise sense as viewed in FIG. 2 until the gripper 44 is close to the frame 1.

Figure 3:
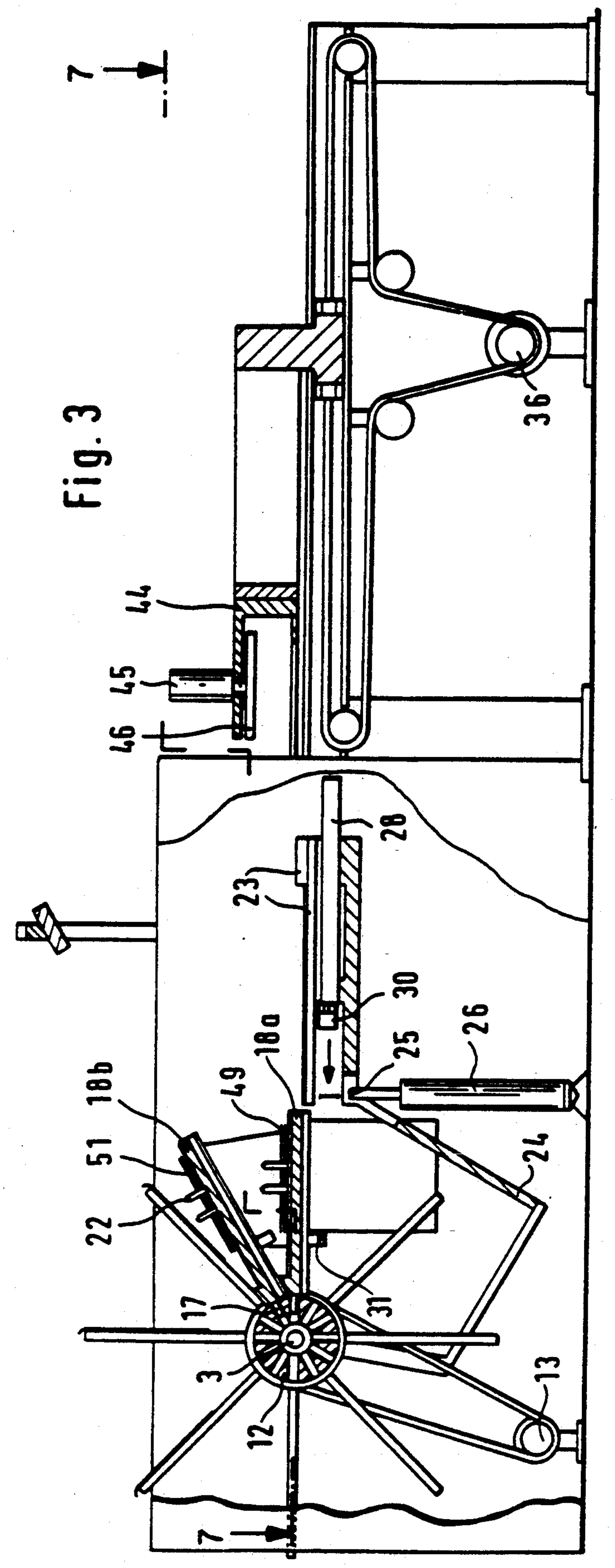

FIG. 3 shows the condition thus assumed. The shaft 3 is rotated so that the stack 51 is formed on the needles 22 of the pallet 18*b*. The pallet holder 12 and the pallet-handling member 23 are at a standstill. The piston of the cylinder 28 pushes the holder 30 and the cylinder 29 to such an extent that the cylinder 29 can push its piston through the bore 31 of the pallet 18*a*. The gripper 44 remains in its previously assumed position.

Figure 4:
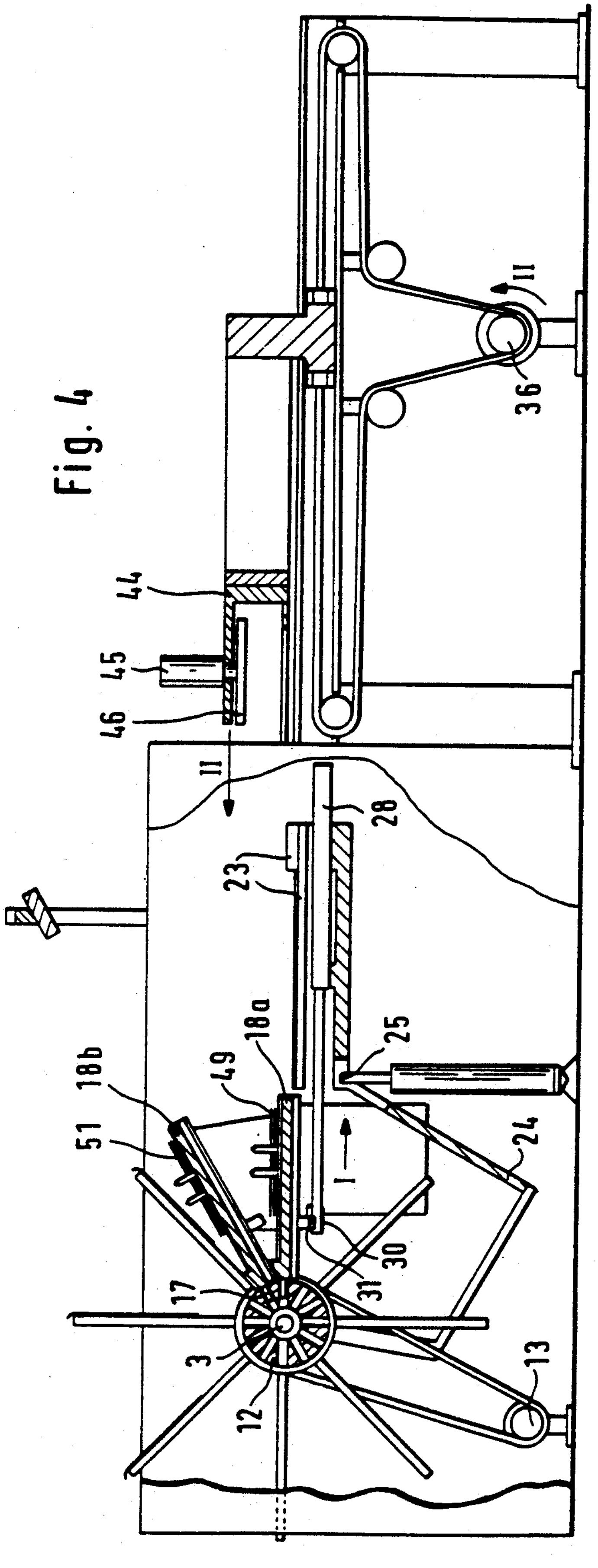

FIG. 4 shows the position which has thus been assumed. As the shaft 3 with the suction arms continues to rotate, the stack 51 is built up further on the pallet 18*b*. The cylinder 29 pushes its piston through the bore 31 of the pallet 18*a* to lock the latter. Thereafter the piston of the cylinder 28 pulls the previously locked pin 17 of the pallet 18*a* out of the pallet holder 12 and pulls the pallet 18*a* onto the pallet-handling member 23. When the pallet 18*a* has reached its end position on the pallet-handling member 23, the gripper 44 is advanced by the motor 36. The bottom surface of the gripper 44 is designed to move past the sides of the needles 22 into the gap between the stack 49 and the pallet 18*a*. The cylinder 45 is then actuated to force the pressure-applying plate against the stack 49.

Figure 5:
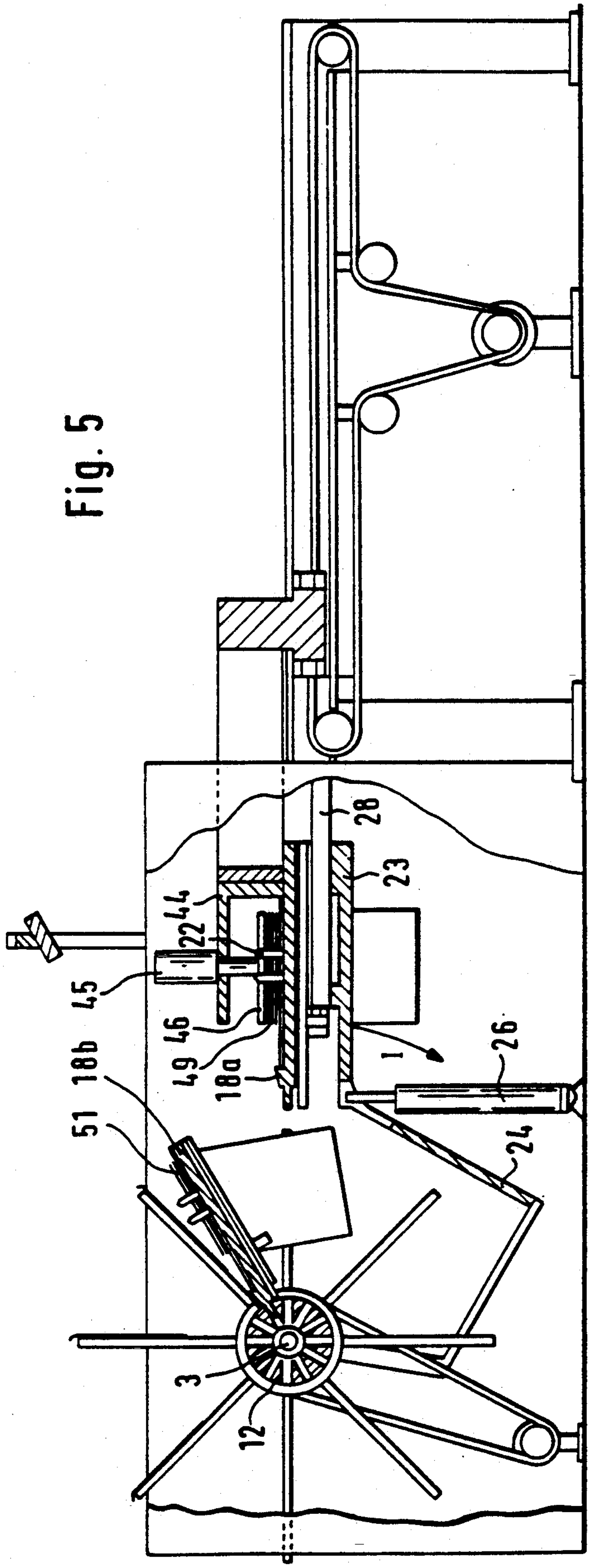

The condition thus assumed is shown in FIG. 5. To permit the gripper 44 to be retracted together with the stack 49 the needles 22 of the pallet 18*a* must be pulled out of the stack 49. For that purpose the piston of the cylinder 26 pulls down the pallet-handling member 23 and the connecting arm 24 so that the pallet 18*a* is pulled down in a direction which is parallel to a tangent to the shaft 3. That descent of the piston of the cylinder 26 is terminated when the stack 49 has been removed from the needles and the gripper 44 can be retracted without an obstruction. The rotation of the shaft 3 with the suction arms is continued. The resulting condition is shown in FIG. 6.

Figure 6:
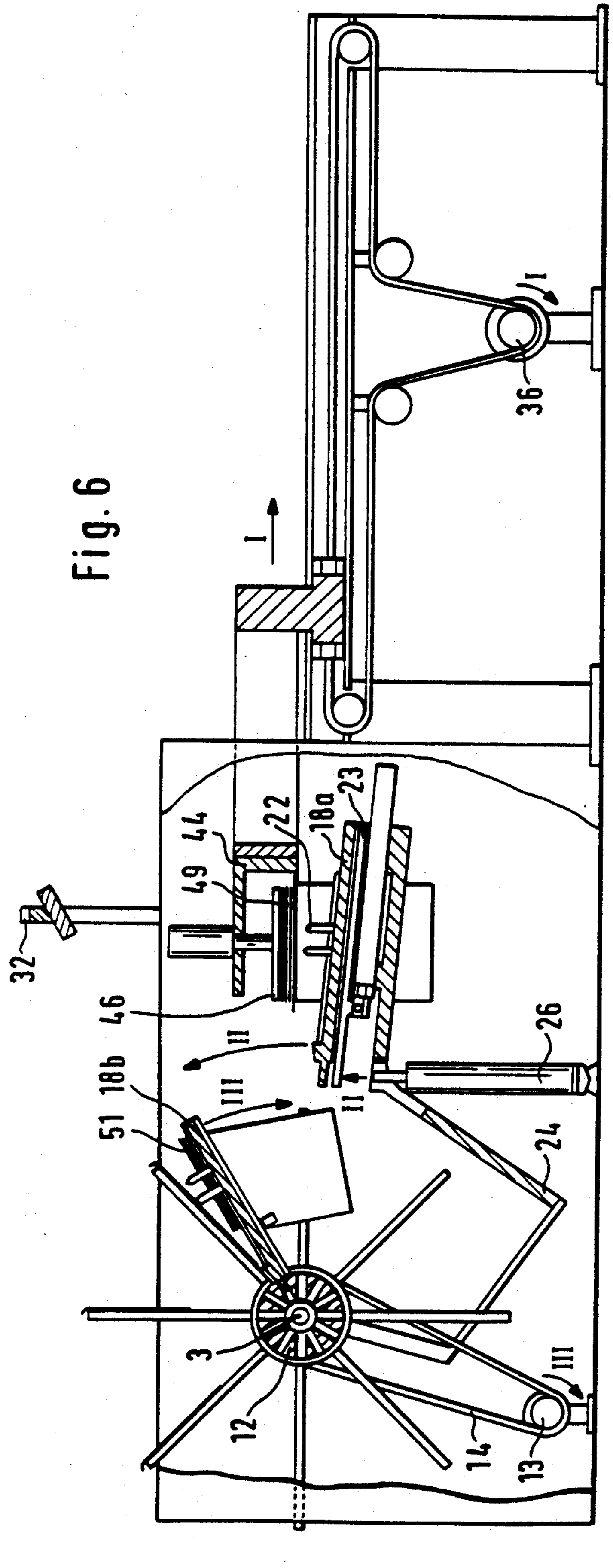

The motor 36 rotates in the clockwise sense as viewed in FIG. 6 to pull the gripper 44 out of the path of the pivotal movement of the pallet-handling member 23. The cylinder 26 raises its piston to pivot the pallet-handling member 23 and the connecting arm 24 about the shaft 3 until the pallet-handling member 23 engages the stop 32. The shaft 3 and the suction arms continue to rotate. By means of the belt 14 the motor 13 rotates the pallet holder 12 about the shaft 3 until the pallet 18*b* has assumed a horizontal position. The depositing of bags on needles holding the stack 51 on the pallet 18*b* may be continued during that turning movement of the pallet holder 12.

The sequence of operations illustrated in FIGS. 1 to 6 is then repeated after the pallets 18*a* and 18*b* have thus interchanged their positions.

We claim:

1. An apparatus for stacking flat objects, preferably double bags which have been severed by hot-wire welding from a tubular web or doubled web of plastic and have opening-defining edges adjacent to the center lines of such double bags, which apparatus comprises a wicketer comprising spokelike radial feeding arms, which are secured to and angularly spaced around a rotatably mounted horizontal shaft and are arranged in pairs of juxtaposed arms spaced along said shaft and are provided with means, preferably suction nozzles, for retaining the objects on said arms, and which apparatus also comprises interchangeable stacking pallets, which are provided with upstanding stacking pins or stacking needles, which are adapted to receive from the feeding arms the objects to be stacked on said pallet, characterized in that a pallet-handling member provided with means for guiding and for retaining a stacking pallet extends approximately radially with respect to the shaft and is pivotally movable about the shaft and is adapted to deliver a stacking pallet to a pallet holder mounted on said shaft when said pallet-handling member is in a first position and to remove the pallet from the pallet holder when the pallet-handling member is in a second position and is then operable to move the pallet to a stack-removing device.

2. An apparatus according to claim 1, characterized in that a drum is freely rotatably mounted on the shaft and the pallet-handling member is pivoted to the shaft by a connecting arm, drive means are provided for moving the stacking pallet in tracks of the pallet-handling member between a retracted position and an extended position, in which the pallet is adapted to be locked to the drum, drive means are provided for rotating the drum, the pallet-handling member is pivotally movable to at least two positions, in one of which the pallet-handling member is adapted to move a pallet toward the drum and to cause the pallet to be locked to said drum, whereas in the second position the pallet-handling member is adapted to extract from the drum a stack-carrying pallet and to move said pallet to a stack-removing device.

3. An apparatus according to claim 2, characterized in that the drum is formed with radial bores or radial openings for receiving projections or pins, which are provided at the forward end of each pallet and can be locked in the bores or openings.

4. An apparatus according to claim 3, characterized in that means for locking the pin or the projection comprise a detent mechanism comprising a spring-biased ball or a spring-biased bolt and a mating recess formed in the pin or projection and adapted to receive and lock the ball or bolt.

5. An apparatus according to claim 3, characterized in that a second pin is provided to hold the pallet against rotation about the first-mentioned pin.

6. An apparatus according to claim 1, characterized in that the pallet-handling member is pivoted to the shaft by a U-shaped connecting arm.

7. An apparatus according to claim 1, characterized in that the upper position to be assumed by the pallet-handling member to permit the pallet to be inserted into the pallet holder is defined by a stop, which is fixed to the frame of the apparatus.

8. An apparatus according to any of the claim 1, characterized in that the pallet-handling member is pivoted to the shaft by a connecting arm, which is pivotally movable by a fluid-operable piston-cylinder unit.

9. An apparatus according to claim 1, characterized in that a fluid-operable piston-cylinder unit is provided for displacing the pallet in tracks of the pallet-handling member.

10. An apparatus according to claim 1, characterized in that the stack-removing device comprises a gripper, which is movable in horizontal tracks.

11. An apparatus according to claim 10, characterized in that the gripper comprises a gripping jaw, which is movable by a fluid-operable piston-cylinder unit.

* * * * *